June 16, 1942.    W. G. GREEN ET AL    2,286,406
TELEMETRIC DEVICE
Filed Feb. 8, 1941    3 Sheets-Sheet 1

Inventor- W. G. Green
E. H. Cooley

Attorney-

Inventor - W. G. Green
E. H. Cooley

W. G. Green
E. H. Cooley   INVENTORS

BY

*R. Werlin* ATTORNEY

Patented June 16, 1942

2,286,406

UNITED STATES PATENT OFFICE 2,286,406

TELEMETRIC DEVICE

William G. Green and Elihu H. Cooley, Tulsa, Okla.; said Cooley assignor to Engineering Laboratories, Inc., Tulsa, Okla., a corporation of Oklahoma Application February 8, 1941, Serial No. 378,074

7 Claims. (Cl. 177—351)

This invention relates to telemetric instruments and particularly to a compass telemetering system.

In the operation and navigation of moving craft such as airplanes, for example, wherein a course is steered, ordinarily, with respect to compass indications, the compass, or direction indicator, is conventionally mounted in the cabin of the plane on the instrument panel, and when so mounted is subject to various errors resulting from deviations due to motor iron, generator stray field, and armor plate magnetization, especially in military planes.

To avoid these errors and their sources, it has been proposed that the compass be located at a point on the plane remote from the objects responsible for such sources of error. For example, the compass may be located at the rear of the plane cabin, or in the tail or in a wing tip. By suitable apparatus the compass indications may then be telemetrically transmitted to a suitable indicating instrument located on the instrument panel of the cabin where it may be under constant direct observation of the pilot or navigator.

The present invention is directed particularly to an improved form of such a remote indicating compass, and more generally to telemetric apparatus which will quickly and accurately transmit to a point remote from the primary position or direction indicating instruments, the record of the positions or directions indicated by such instruments.

In accordance with one modification of this invention relating particularly to an airplane compass system, the compass element is located at some point in an airplane remote from sources of local attraction or other error, and its magnetic needle is arranged to drive a contact arm around a ring of contact points surrounding the pivot of the needle and radially arranged to indicate compass points in intervals of any desired number of degrees, depending upon the accuracy desired in the remote indicating instrument. The indicating instrument, which is located under the direct observation of the pilot or navigator, consists essentially of a toroidal coil comprising an iron ring core on which is wound a plurality of symmetrically arranged, serially connected coils. The number of coils is made equal to the number of contact points in the compass. Individual conductors connect the several contact points of the compass element with their respective coils and a source of current is connected into a novel form of return circuit, to be described in greater detail hereinafter. A magnetized pointer is mounted to rotate within the inner periphery of the toroidal coil and indicates the position of the compass needle as telemetrically transmitted thereto from the compass element, in a manner to be more fully described hereinafter.

The apparatus constructed in accordance with this invention is relatively simple in form and cheaper to construct than any previous devices of which we are aware; is highly accurate, rapid and positive in action; and is especially adapted for electromagnetic damping, thereby eliminating the liquid damping more conventionally employed in compass systems and the errors normally attendant upon liquid damping.

The various objects and advantages of this novel invention will be readily understood from the following detailed description when read in conjunction with the accompanying drawings, which illustrate one modification of apparatus in accordance with this invention. It will be understood, however, that this invention is not limited to any particular apparatus, but that various changes may be made in details, but within the scope of the appended claims, and without departing from the spirit of this invention.

Figure 1:
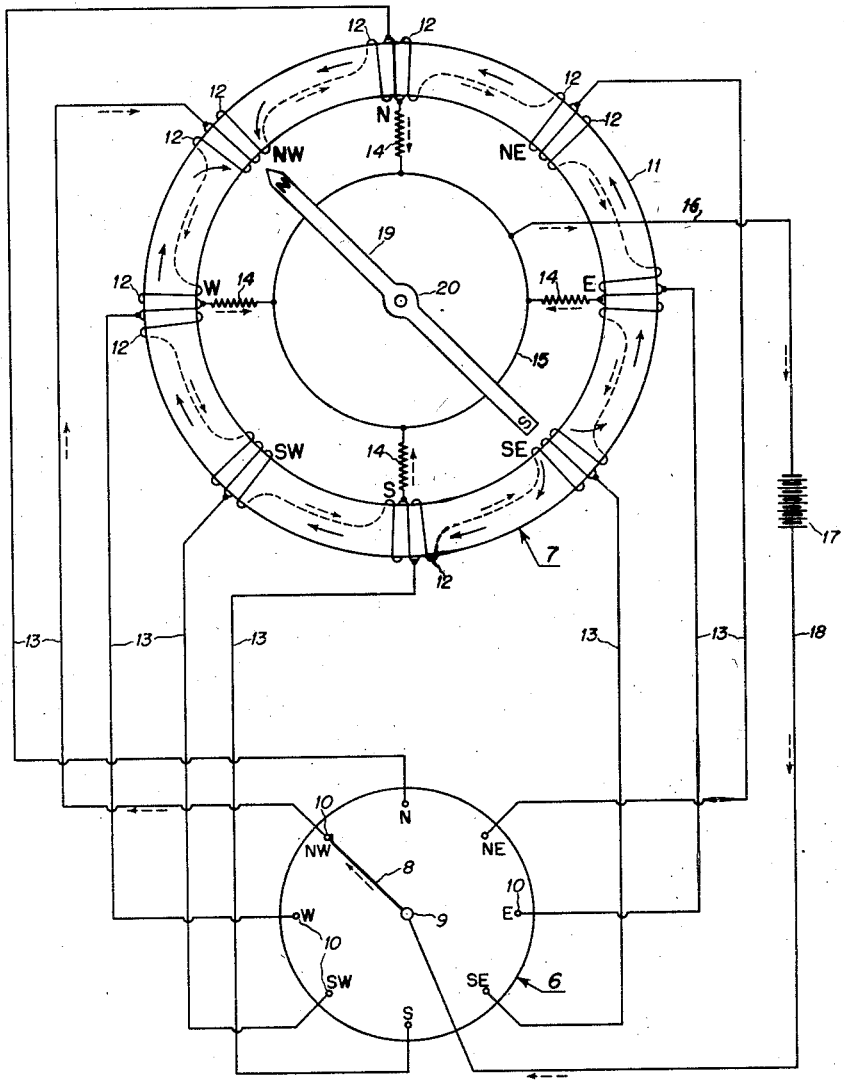
Fig. 1 is a schematic diagram of the electrical arrangements and connections of a complete compass system in accordance with one embodiment of this invention.
Figure 4:
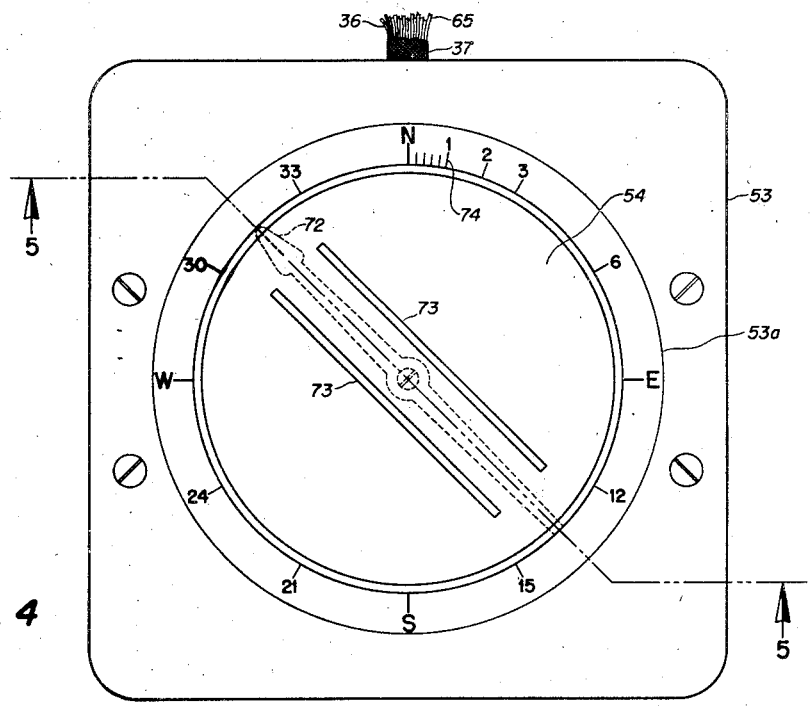
Fig. 4 is a plan view of the remote indicating element of the system.

The compass system in accordance with the illustrative embodiment of this invention is shown schematically in Fig. 1 in which the compass element is designated generally by the numeral 6, and the remote indicating element by the numeral 7. In Fig. 1, the needle itself of the compass is not shown but is represented in its position by the contact arm 8 which is carried by the needle and turns therewith about the pivot 9 which is suitably mounted in the center of the compass element 6. The pivot 9 is surrounded by a ring of contact points 10 with which the free end of contact arm 8 makes contact successively as it turns upon its pivot. The contact points 10 represent in their positions the several points of the compass and are here designated by the usual abbreviations for such points. In Fig. 1, eight of the principal points of the compass are so designated. However, as shown in Fig. 4, the positions are also designated in numbers of degrees of rotation with respect to north. The number of contact points 10 which are employed will be determined, of course, by the accuracy of reading desired. In practice it is found that sixty contact points, spaced at intervals of six degrees, will, by suitable electrical connections and arrangements of the apparatus to be described hereinafter, give readings of the remote indicator element which will be accurate to about one and one-half degrees.

The indicating element 7 comprises a toroidal coil consisting of an iron core ring 11 on which is wound a plurality of inductive coils 12, equally spaced about the ring and connected together in series-aiding arrangement. The number of such coils is equal to the number of contact points 10 employed in the compass element, and the angular position of each coil on the ring is the same as that of its corresponding contact point 10. For purposes of illustration, only the end turns of adjacent coils and their junction points are shown. Each coil junction is connected by a separate conductor 13 to a contact point 10 of the compass element. By connecting the coil junctions successively to the contact points in the same succession, each coil is made to represent in its position the compass position represented by its contact point. To every second junction a resistor 14 is connected and these resistors are all connected to a common conductor 15 which is connected by a lead 16 to a battery 17, the other side of which is connected by a lead 18 to the contact arm 8, thus completing the circuit connections for the system.

The number of resistors 14 employed is not restricted to half the number of coils, but may be any other suitable number which should, however, be so connected to the group of coils on the ring 11 as to provide a symmetrical series of current outlet connections about the ring.

A permanent magnet 19 is mounted on a pivot 20 so as to be freely rotatable within the toroid, and forms the pointer needle of the indicator element 7.

The system, as schematically represented in Fig. 1, functions in the following manner: Assume that the heading of the airplane has caused the compass needle to bring the contact arm into contact with that contact point 10 representing the compass direction NW. Current from the battery 17 will flow through conductor 13 to the junction of the corresponding coil 12 of the indicator instrument and the current entering this coil splits and equal amounts flow in opposite directions through the adjacent and succeeding coils. At each junction to which a resistor 14 is connected, a minor portion of the current passing that point bleeds-off through the resistor and returns to the battery through conductors 15 and 16. Thus the currents flowing away from the entrance junction in the two halves of the toroid becomes progressively weaker as each resistor drains more of the current back to the battery. As a result, the magnetic fluxes in the two halves of the toroid are of the same order of intensity at corresponding points in the halves of the toroid and are so oriented as to oppose each other. The return flux from each half of the toroid leaves the iron ring at the point of junction (point of current entry) and returns along an approximate diameter of the ring in a more or less dispersed manner. The permanent magnet 19, being mounted free to rotate concentric with the toroid, will turn so as to align itself with the flux in this air path across the diameter of the ring. Thus a flux is provided in the air gap whose direction is dependent on the location of the junction at which the current is fed into the coil circuit. The point of greatest attraction for the polar opposite end of the permanent magnet 19 will be the junction point at which the current enters the toroid.

The described symmetrical arrangement of resistors 14 provides a ladder-type attenuator which produces a progressively weakened current pattern extending throughout the halves of the toroid in opposite directions from the entrance junction. This current pattern (represented by the dotted arrows in Fig. 1) induces a corresponding flux pattern (represented by the solid arrows), of corresponding intensity which gradually increases in the reverse direction, that is, toward the current entrance junction. The flux thus induced serves to always pull the permanent magnet 19 from whatever position it may be at a given instant to the point at which the current enters the toroid. Since there is always some current present at every point in the ring, the magnet 19 will always be subjected to a pull toward the current entry junction by the induced flux, and there can, therefore, be no "dead" spots in the ring at which the magnet would be likely to stick. Furthermore by this arrangement, the response of the magnet 19 to changes in position of the compass needle will always be quick and positive.

It will be evident that as the compass needle turns, driving contact arm 8, the point of entry of the current into the series of coils 12 will rotate correspondingly so that one coil at a time will have its current reversed, thus leaving one group of coils and joining the opposite group. By this arrangement, the current and flux patterns in the toroid will be unchanged, but only the point of maximum attraction for the permanent magnet 19 will shift in direct correspondence with the shifting or rotation of the position of the compass needle and contact arm 8.

Figure 2:
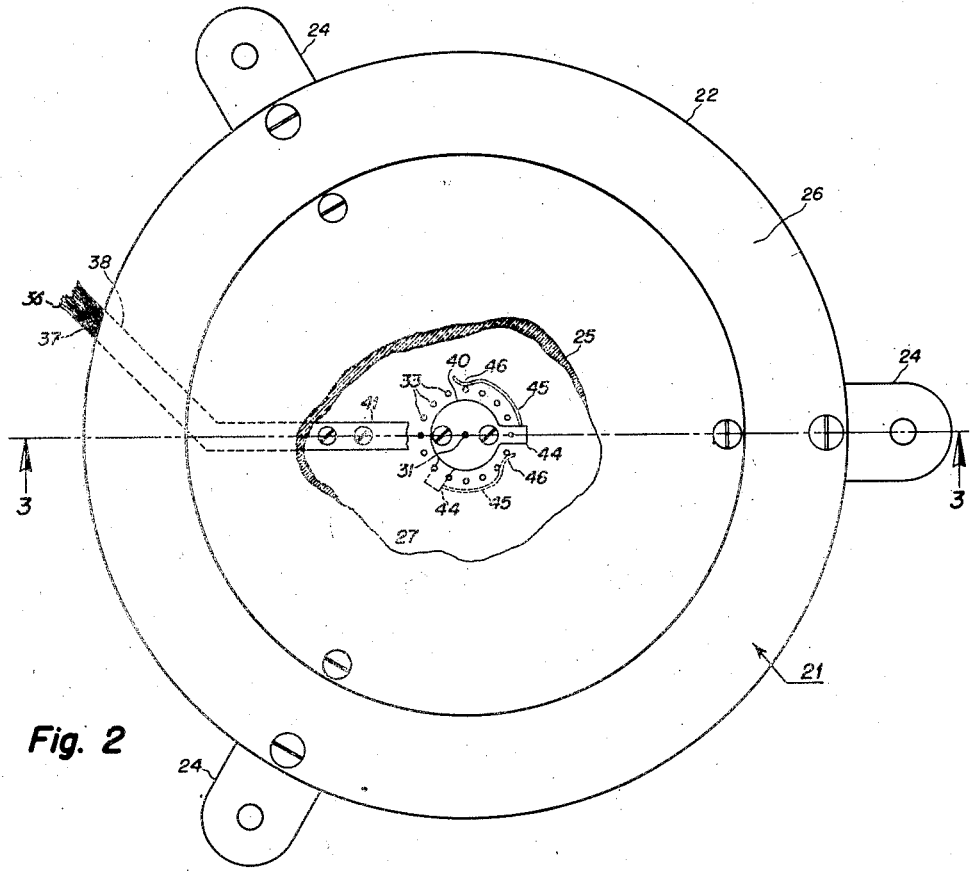
Fig. 2 is a plan view of the compass element of said system.
Figure 3:
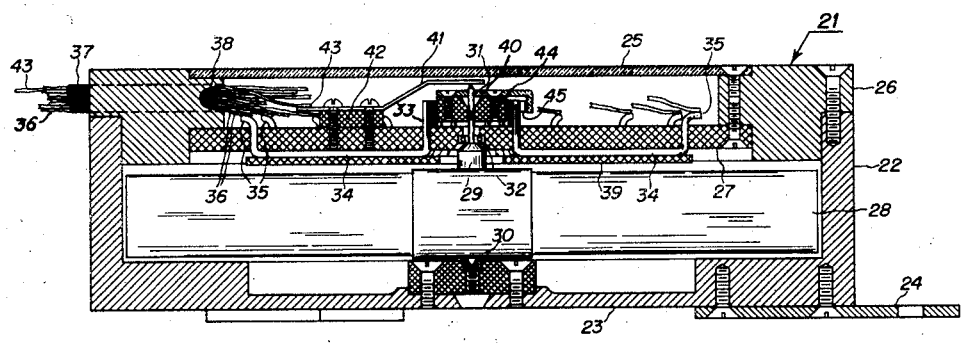
Fig. 3 is a cross-sectional view taken along line 3—3 of Fig. 2.

By shaping the contact arm 8 in a suitable form, as will be hereinafter described in connection with the other figures of the drawings, the contact arm, during half of its movement from one position to the next, may be made to contact only one contact point 10, as illustrated in Fig. 1, and during the other half of its movement to the next point may be made to contact two adjacent contact points simultaneously, as shown in the dotted outlines in Fig. 2. The result is that the coil 12 extending between the two adjacent junction points corresponding to these two adjacent contact points will have its opposite ends short-circuited together and this coil will, therefore, carry no current. In this case, the balance points of the opposing magnetic fluxes in the ring 11 is at a point midway through the short-circuited coil instead of at one or the other of its ends, so that there will thus be provided twice as many balance points as there are coils 12. Therefore, in a system employing sixty contact points and sixty coils spaced at intervals of six degrees, there will be one hundred and twenty position ranges of the compass reproducible at the indicator element so that each range is three degrees wide. Since the correct angle of the compass needle is within these three degree ranges, the reading of the indicator element will always be within one and one-half degrees of the correct angle actually indicated by the compass needle.

It will be understood, of course, that any greater or lesser number of contact points and coils may be employed in accordance with the accuracy desired.

Reference will now be had to Figs. 2 to 5 for a description of the mechanical construction of a compass system in accordance with this invention employing the principles set forth above.

The compass element (Figs. 2 and 3) consist of a hollow circular housing 21 having an upstanding circular side wall 22 and bottom 23 constructed preferably of electrically conductive metal such as copper or aluminum to permit of magnetic damping of the compass needle in a manner to be described later. The bottom 23 is provided with radially extending mounting lugs 24 for attachment to the moving craft. The housing may, if desired, be mounted in conventional gimbals (not shown) to keep it level in all positions of the moving craft. The top of housing 21 is closed by means of a transparent cover plate 25 which is suitably fastened to an annular rim 26. A partitioning member 27, constructed of a suitable electric insulating material, extends transversely across the interior of the housing at an intermediate level therein and is suitably fastened to rim 26. A magnetic needle 28 is mounted in the housing in the space below partition member 27 and is rotatable therein on a pivot pin 29, the lower end of which is supported in a bearing 30 centrally positioned on bottom 23, and the upper end of pivot pin 29, comprising an elongated pin 31, extends for a substantial distance above the upper face of member 27 through a sleeve bearing 32 centrally positioned in the partitioning member 27.

As illustrated, the magnetic needle 28 is in the form of a bar magnet, but it will be readily understood that it may be of any of the usual "built-up" types commonly used in compass construction. The length of the needle 28 is made only slightly less than the interior diameter of the housing 21 so as to bring the ends thereof in close proximity to the wall 22, whereby the rotary movement of the ends of the needle past the wall will induce eddy currents in the electrically conductive metal forming wall 22 and produce electro-magnetic damping of the swinging movements of the needle.

A ring of metallic contact points 33 is concentrically arranged on top of partitioning member 27 about the upper end of pin 31 which protrudes above member 27. The number and angular spacing of these points depend upon whatever accuracy range is desired. As indicated above, sixty contact points, spaced six degrees apart, is found to be suitable for most practical purposes. Each of the contact points is fixedly mounted in partitioning member 27 and extends to the lower side thereof where each is connected by a lead 34 to a corresponding terminal point 35 from which individual conductors 36, collected in the form of a multi-conductor cable 37, are led from the housing 21 through a conduit 38 to the indicator element of the system. The group of leads 34 extending underneath member 27 to their respective terminal points 35 is insulated from magnet 28 by means of a sheet of insulating material 39.

Pin 31 extends through the center of a circular metallic block 40 which is fixedly attached to the pin and rotates therewith in accordance with the rotary movements of needle 28. The diameter of block 40 is less than that of the surrounding ring of contact points so that it will rotate freely within the ring and be spaced slightly therefrom. Block 40 is also so mounted on pin 31 that its lower surface is slightly spaced vertically from the upper surface of member 27. The upper tip of pin 31 is pointed and extends above the upper face of block 40 where it is in continuous contact with a metallic contactor strip 41 which extends laterally from the point of contact with pin 31 to a support block 42 through which the outer end of strip 41 is firmly attached to the upper face of member 27. A battery lead 43, forming one of the strands of cable 37, connects contactor strip 41 to a battery or other source of current (not shown) corresponding to the battery 17 of Fig. 1, from which current is supplied to the system.

Extending radially from block 41 is an arm 44 carrying a thin metallic brush 45 provided with a tip 46 of reversed curvature relative to that of the ring of contact points 33. Rotation of block 40 with the movements of the compass needle causes tip 46 to brush against the contact points 33. By virtue of its conformation, tip 46 will contact only a single contact point 33 during one-half of its travel from one point to the next, as illustrated in solid outlines in Fig. 2, and will contact that same point and its adjacent contact point during the remaining one-half of its travel to the second point. This latter position is shown in dotted outlines in Fig. 2.

Figure 5:
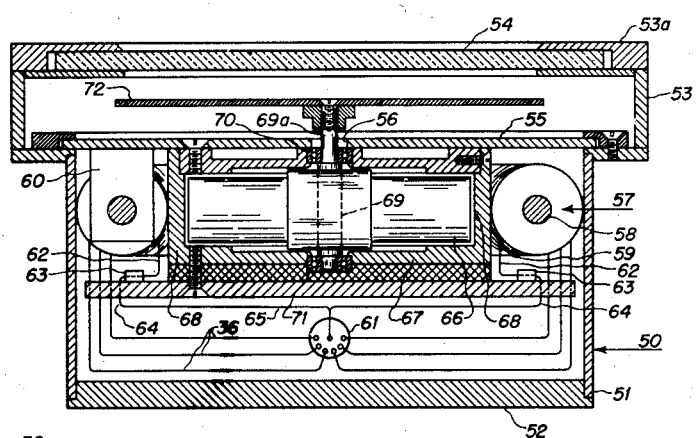
Fig. 5 is a cross-sectional view taken along line 5—5 of Fig. 4.

The remote indicator element of the system, corresponding to element 7 of Fig. 1, is illustrated in detail in Figs. 4 and 5. The indicator element includes a housing, designated generally by the numeral 50, which may be of circular or rectangular form, having upstanding side walls 51 and a bottom 52, and surmounted by a sight box 53 of somewhat larger cross-sectional area than housing 50 and having appreciable depth. A circular cover glass 54 is set into a rim 53a in the top of the sight box 53 and is arranged to be rotatable therein. A partition 55, having a central opening 56, divides the sight box 53 from the remainder of the housing.

Figure 6:
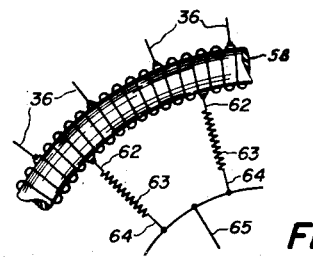
Fig. 6 is a fragmentary schematic diagram illustrative of another embodiment of this invention.

The telemetric apparatus employed to indicate the compass needle positions is mounted in the housing 50 beneath partition 55 and comprises a toroidal coil 57 consisting of an iron core ring 58 about which is wound inductively a series of coils 59, in a manner generally in accordance with the schematic arrangement illustrated in Fig. 1 and described above. The coil 57 is supported from the partition 55 by means of suitably spaced hangers 60. For practical purposes, the coils 59 comprise a continuous symmetrical winding, shown schematically in Fig. 6, which is tapped on one side at a plurality of equal angularly spaced points about the periphery of the winding, the number of taps being equal to the number of contact points 33 of the compass element. The multi-conductor cable 37 is led into the lower portion of housing 50 through a conduit 61 and the individual conductors 36 are each connected to one of the taps corresponding in position to the position of that contact point 33 to which the other end of that individual conductor is connected. The opposite side of the winding constituting coils 59 is tapped at a plurality of equal angularly spaced points, the number of which is generally less than the number of the inlet taps. A lead 62 connects each of the outlet taps to an individual resistor 63 from which a lead 64 goes to a common conductor 65 which is led from housing 50 through conduit 61, and goes to the other side of the battery or other source of current which supplies current to lead 43 of the compass element.

A bar magnet 66 is mounted to rotate freely in a horizontal plane within the periphery of toroid 57. Magnet 66 is completely enclosed within a circular casing 67 constructed of a suitable electrically conductive metal such as copper or aluminum, and having side walls 68 which are thus interposed between the ends of magnet 66 and the inner periphery of the toroid 57. Magnet 66 is mounted on a pivot 69 which is suitably journalled in bearings 70 and 71, positioned in axial alignment in the top and bottom, respectively, of casing 67. An extension 69a of the upper end of pivot 69 passes through opening 56 into sight box 53, and a pointer 72 is fixedly attached thereto so as to rotate with magnet 66.

The cover glass 54 is preferably marked with a pair of spaced parallel lubber lines 73—73, and a scale 74, calibrated in degrees of a circle and marked with compass directions at appropriate points, is provided about the inner periphery of rim 53a.

The system comprising the devices illustrated particularly in Figs. 2, 3, 4 and 5 functions essentially in the same manner as described above in connection with the more schematic arrangement illustrated in Fig. 1 in transmitting the direction indications of compass needle 28 to the indicating element and the pointer 72.

By surrounding the magnets 28 and 66 in the compass and indicator elements, respectively, with copper or aluminum, the rotation of the magnets will induce eddy currents therein and will thereby produce electro-magnetic damping of the movements of the magnets, without the interposition of any other special mechanism. The damping thus produced is completely effective and construction of the compass and indicator elements is thereby greatly simplified and reduced in cost and errors arising from conventional liquid damping is thereby eliminated.

The system above described is very economical in operation, the current required being of the order of about 50 milliamperes which constitutes a very small drain on the battery of the airplane or other moving craft in which the system is installed. A 12 volt battery is adequate for supply of the current required.

It will be understood that conventional means, such as adjusting knobs and mechanisms, correction scales and lubber line arrangements may be employed in connection with the indicator element for correcting the indicated readings for wind angle, magnetic variations and the like. Such modifications and additions being well understood in the art to which this invention pertains.

Course direction may be indicated by rotating cover glass 54 until the lubber lines 73—73 point in the desired direction relative to scale 74 and the craft is then navigated so as to hold pointer 72 between these lines.

While a compass system has been described herein by way of an exemplifying illustration of one application of this invention, it will be readily apparent that a telemetric system has been described which has much wider application and may be employed for telemetering the position indications of many types variable position indicating instruments other than compasses.

What we claim and desire to secure by Letters Patent is:

1. A telemetric device for producing indications of the changing position of a moving object distantly removed therefrom, comprising, a toroidal iron ring, an inductive winding symmetrically wound thereon, a plurality of current input points on said winding, the peripheral position of each of said points corresponding to pre-determined position of said object, a magnetic pointer pivotally mounted to rotate within the periphery of said ring, its angular position relative thereto being subject to magnetic flux conditions induced in said ring by current passing through said winding and by the point of entry of current into said winding, a current source connected to said winding, selector means connected to said current source and operative by the movements of said object to selectively connect said current source to the current input point on said winding corresponding to the position of said object, and a current attenuating network symmetrically connected to said winding and interposed between said winding and said current source.

2. A telemetric device for producing indications of the changing position of a moving object distantly removed therefrom, comprising, a toroidal iron ring, an inductive winding symmetrically wound thereon, a plurality of current input points on said winding, the peripheral position of each of said points corresponding to a pre-determined position of said object, a magnetic pointer pivotally mounted to rotate within the periphery of said ring, its angular position relative thereto being subject to magnetic flux conditions induced in said ring by current passing through said winding and by the point of entry of current into said winding, a current source connected to said winding, selector means connected to said current source and operative by the movements of said object to selectively connect said current source to the current input point on said winding corresponding to the position of said object, a current attenuating network symmetrically connected to said winding and interposed between said winding and said current source, and means for effecting electromagnetic damping of said pointer including an electrically conductive element interposed between said pointer and the inner periphery of said toroidal ring.

3. A telemetric device for producing indications of the changing position of a pivoted compass needle distantly removed therefrom, comprising, a toroidal iron ring, an inductive winding symmetrically wound thereon, a plurality of symmetrically spaced current input points on said winding, the peripheral position of each of said points corresponding to a position of said needle, a magnetic pointer pivotally mounted within the periphery of said ring and having its angular position relative thereto subject to magnetic flux conditions induced in said ring by current passing through said winding and by the point of entry of the current into said winding, a current source connected to said winding, a current attenuating network symmetrically connected to said winding and interposed between said winding and said current source, and selector means connected to said current source and operative by the movements of the compass needle to selectively connect said current source to the point on said winding corresponding to the position of said compass needle.

4. A telemetric device for producing indications of the changing position of a pivoted compass needle distantly removed therefrom, comprising, a toroidal iron ring, an inductive winding symmetrically wound thereon, a plurality of symmetrically spaced current input points on said winding, the peripheral position of each of said points corresponding to a position of said needle, a magnetic pointer pivotally mounted within the periphery of said ring and having its angular position relative thereto subject to magnetic flux conditions induced in said ring by current passing through said winding and by the point of entry of the current into said winding, a current source connected to said winding, a current attenuating network symmetrically connected to said winding and interposed between said winding and said current source, selector means connected to said current source and operative by the movements of the compass needle to selectively connect said current source to the point on said winding corresponding to the position of said compass needle, and means for effecting electro-magnetic damping of said pointer comprising an electrically conductive element interposed between said pointer and the inner periphery of said toroidal ring.

5. A telemetric device comprising, a toroidal iron ring, an inductive winding symmetrically wound on said ring, a plurality of current input taps for said winding symmetrically spaced around said ring, a plurality of current outlet taps for said winding symmetrically spaced around said ring, a bar magnet positioned diametrically of said ring and pivoted to rotate within the periphery of said ring, a current attenuating network connected to said outlet taps, a source of current, a conductor connecting said network to said source of current, and selector means for connecting said current source to selected ones of said current input taps.

6. A telemetric device comprising, a toroidal iron ring, an inductive winding symmetrically wound on said ring, a plurality of current input taps for said winding symmetrically spaced around said ring, a plurality of current outlet taps for said winding symmetrically spaced around said ring, a bar magnet positioned diametrically of said ring and pivoted to rotate within the periphery of said ring, a current attenuating network connected to said outlet taps, a source of current, a conductor connecting said network to said source of current, selector means for connecting said current source to selected ones of said current input taps, and an annular electrically conductive element concentrically interposed between the inner periphery of said ring and the path of rotation of the ends of said bar magnet to effect electro-magnetic damping of said bar magnet.

7. A telemetric device comprising, a toroidal iron ring, an inductive winding symmetrically wound on said ring, a plurality of current input taps for said winding symmetrically spaced around said ring, a plurality of current outlet taps for said winding symmetrically spaced around said ring, a bar magnet positioned diametrically of said ring and pivoted to rotate within the periphery of said ring, a current attenuating network connected to said outlet taps and comprising a conductor and a plurality of resistor elements connecting said outlet taps in parallel to said conductor, a current source connected to said conductor, and selector means for connecting said current source to selected ones of said current input taps.

WILLIAM G. GREEN.
ELIHU H. COOLEY.